(12) United States Patent
Katagiri et al.

(10) Patent No.: US 6,855,442 B2
(45) Date of Patent: Feb. 15, 2005

(54) FUEL CELL AND METHOD OF OPERATING SAME

(75) Inventors: Toshikatsu Katagiri, Utsunomiya (JP); Yoshio Nuiya, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 355 days.

(21) Appl. No.: 10/164,644

(22) Filed: Jun. 7, 2002

(65) Prior Publication Data
US 2002/0187383 A1 Dec. 12, 2002

(30) Foreign Application Priority Data
Jun. 8, 2001 (JP) ........................................ 2001-174862

(51) Int. Cl.$^7$ .............................................. H01M 8/04
(52) U.S. Cl. .......................... 429/13; 429/24; 429/26; 429/30; 429/34
(58) Field of Search ............................ 429/13, 34, 30, 429/24, 26

(56) References Cited

U.S. PATENT DOCUMENTS

| | | | |
|---|---|---|---|
| 5,260,143 A | 11/1993 | Voss et al. | 429/13 |
| 5,441,819 A | 8/1995 | Voss et al. | 429/13 |
| 5,547,776 A | 8/1996 | Fletcher et al. | 429/13 |
| 6,013,385 A | * 1/2000 | DuBose | 429/17 |
| 6,015,633 A | * 1/2000 | Carlstrom et al. | 429/13 |
| 6,045,933 A | 4/2000 | Okamoto | 429/17 |
| 2002/0041985 A1 | 4/2002 | Shimanuki et al. | 429/17 |
| 2002/0146612 A1 | * 10/2002 | Sugiura et al. | 429/32 |

FOREIGN PATENT DOCUMENTS

| | | |
|---|---|---|
| JP | 06068886 A | 3/1994 |
| JP | 10284095 A | 10/1998 |

* cited by examiner

*Primary Examiner*—John S. Maples
(74) *Attorney, Agent, or Firm*—Lahive & Cockfield, LLP; Anthony A. Laurentano, Esq.

(57) ABSTRACT

A fuel cell has a fuel gas passage disposed therein, a circulation passage connecting a fuel gas pump in series to the fuel gas passage, and an intermediate fuel gas supply mechanism. The intermediate fuel gas supply mechanism supplies a fuel gas, which is lower in humidity than a fuel gas flowing upstream of a intermediate fuel gas supply port in the fuel gas passage, to the intermediate fuel gas supply port, for thereby preventing water from being condensed in the fuel gas passage.

13 Claims, 12 Drawing Sheets

FUEL CELL AND METHOD OF OPERATING SAME

BACKGROUND OF THE INVENTION

1. Field of the Invention

The present invention relates to a fuel cell having a membrane electrode assembly comprising a solid polymer ion exchange membrane, an anode electrode mounted on one surface of the solid polymer ion exchange membrane, and a cathode electrode mounted on the other surface of the solid polymer ion exchange membrane, the membrane electrode assembly being sandwiched between an anode separator and a cathode separator, and a method of operating such a fuel cell.

2. Description of the Related Art

Usually, solid polymer electrolyte fuel cells employ an ion exchange membrane comprising a polymer ion exchange membrane (cation exchange membrane). A solid polymer electrolyte fuel cell comprises a unit cell (unit generation cell) comprising a joint body (membrane electrode assembly) made up of anode and cathode electrodes, each having a base made chiefly of carbon and a catalytic electrode layer of precious metal, disposed respectively on both sides of an ion exchange membrane, the joint body being sandwiched between separators (bipolar plates). Usually, a certain number of such unit cells are stacked to form a fuel cell stack.

In the fuel cell of the above type, a fuel gas such as a gas mainly containing hydrogen (hereinafter referred to as "hydrogen-containing gas") is supplied to the anode electrode, and hydrogen is ionized on the catalytic electrode layer of the anode electrode and moves through the ion exchange membrane toward the cathode electrode. Electrons produced while the hydrogen ions are moving toward the cathode electrode are extracted by an external circuit and used as DC electric energy.

Since the cathode electrode is supplied with an oxidizing gas, e.g., a gas mainly containing oxygen or air (hereinafter referred to as "oxygen-containing gas"), the hydrogen ions, the electrons, and the oxygen react with each other, producing water (hereinafter also referred to as "reaction-produced water") at the cathode electrode.

The fuel cell stack has been disadvantageous in that because water produced by an electrochemical reaction tends to be accumulated at the cathode electrode, the fuel cell stack is liable to have its electric generating capability lowered and the membrane electrode assembly is likely to be unduly expanded. Various attempts have heretofore been made to remove the water accumulated at the cathode electrode.

For example, there are known a technique disclosed in U.S. Pat. No. 5,260,143 (hereinafter referred to as "first prior art"), a technique disclosed in U.S. Pat. No. 5,441,819 (hereinafter referred to as "second prior art"), and a technique disclosed in U.S. Pat. No. 5,547,776 (hereinafter referred to as "third prior art").

According to the first prior art, a pressure drop is provided between the inlet and outlet of a cathode gas passage to remove reaction-produced water from the cathode. Specifically, the pressure drop is developed by providing an orifice at the inlet of the cathode gas passage, elongating the cathode gas passage, or changing the cross-sectional shape of the cathode gas passage.

According to the second prior art, the temperature of a hydrogen-containing gas supplied from the inlet to outlet of an anode gas passage is kept at a temperature equal to or higher than the condensation temperature of water vapor contained in the hydrogen-containing gas. Water accumulated at the cathode is diffused back toward the anode due to a concentration gradient, and removed as water vapor into the hydrogen-containing gas.

According to the third prior art, a temperature gradient is provided in the plane of a cathode electrode to establish a low-temperature area corresponding to an area where an oxygen-containing gas contains a minimum amount of water and a high-temperature area corresponding to an area where the oxygen-containing gas contains a maximum amount of water.

The first prior art is problematic in that since the pressure drop is provided in the cathode gas passage, the supplied amount of reactive gases (the hydrogen-containing gas and the oxygen-containing gas) is limited, resulting in a reduction in the electric generating efficiency.

The second prior art is disadvantageous in that a temperature control process for controlling the temperature of the hydrogen-containing gas at a desired temperature is considerably complex, and cannot be performed highly accurately.

Problems of the third prior art are that the temperature gradient provided in the plane of the cathode electrode limits the shape of a gas passage, reducing the freedom of design, and dimensional changes caused by thermal expansion develop clearances or gaps in the fuel cell stack, causing a reduction in the electric generating capability thereof.

The inventions according to the first through third prior art are aimed at only the removal of water accumulated at the cathode. However, water is also accumulated at the anode because the relative humidity of the water vapor increases when the hydrogen contained in the hydrogen-containing gas is consumed. The water accumulated at the anode needs to be removed in order to keep the electric generating capability at an effective level.

SUMMARY OF THE INVENTION

It is a major object of the present invention to provide a fuel cell capable of reliably preventing water from being condensed at an anode with a simple arrangement and process, and a method of operating such a fuel cell.

According to the present invention, a fuel cell has a membrane electrode assembly comprising a solid polymer ion exchange membrane, an anode electrode mounted on one surface of the solid polymer ion exchange membrane, and a cathode electrode mounted on the other surface of the solid polymer ion exchange membrane, an anode separator, a cathode separator, the membrane electrode assembly being sandwiched between the anode separator and the cathode separator, a fuel gas passage disposed between the anode electrode and the anode separator, a circulation passage connecting a fuel gas pump disposed outside of the fuel cell in series to the fuel gas passage, an intermediate fuel gas supply port connected to the fuel gas passage between a fuel gas inlet and a fuel gas outlet thereof, an intermediate fuel gas supply mechanism for supplying a fuel gas, which is lower in humidity than a fuel gas flowing upstream of the intermediate fuel gas supply port, from the intermediate fuel gas supply port to the fuel gas passage.

According to the present invention, the fuel cell is operated by supplying a fuel gas, which is lower in humidity than a fuel gas flowing upstream of the intermediate fuel gas supply port, from the intermediate fuel gas supply port to the fuel gas passage, thereby preventing water from being condensed in the fuel gas passage.

While the fuel cell is in operation, water is produced by a reaction on the cathode electrode. Therefore, water vapor is diffused back from the cathode electrode into the fuel gas passage facing the anode electrode, and the fuel gas in the fuel gas passage tends to be excessively saturated by the consumption of the fuel gas when electric energy is generated by the fuel cell.

At this time, since the fuel gas of lower humidity than the fuel gas flowing upstream of the intermediate fuel gas supply port is supplied to the fuel gas passage, the relative humidity of the fuel gas in the fuel cell is maintained at a level optimum for the generation of electric energy, for effectively preventing water from being condensed.

The fuel gas pump disposed outside of the fuel cell and the fuel gas passage are connected in series to each other through the circulation passage. Consequently, the discharged gas from the fuel cell flows through the circulation passage, and is supplied again as a fuel gas to the fuel cell through the circulation passage. The fuel gas can thus efficiently be used.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
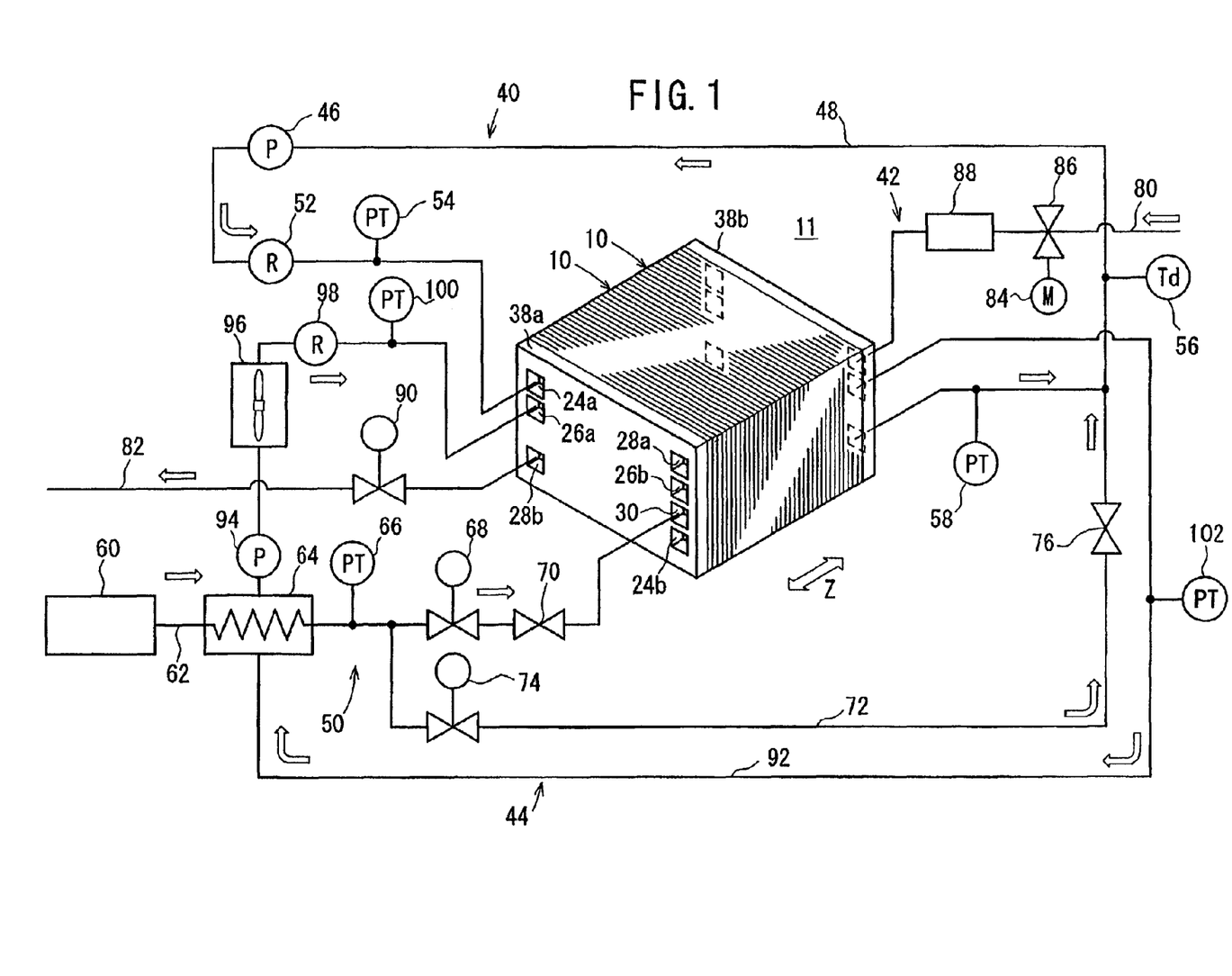
FIG. 1 is a schematic perspective view of a fuel cell stack incorporating a fuel cell according to a first embodiment of the present invention.
Figure 2:
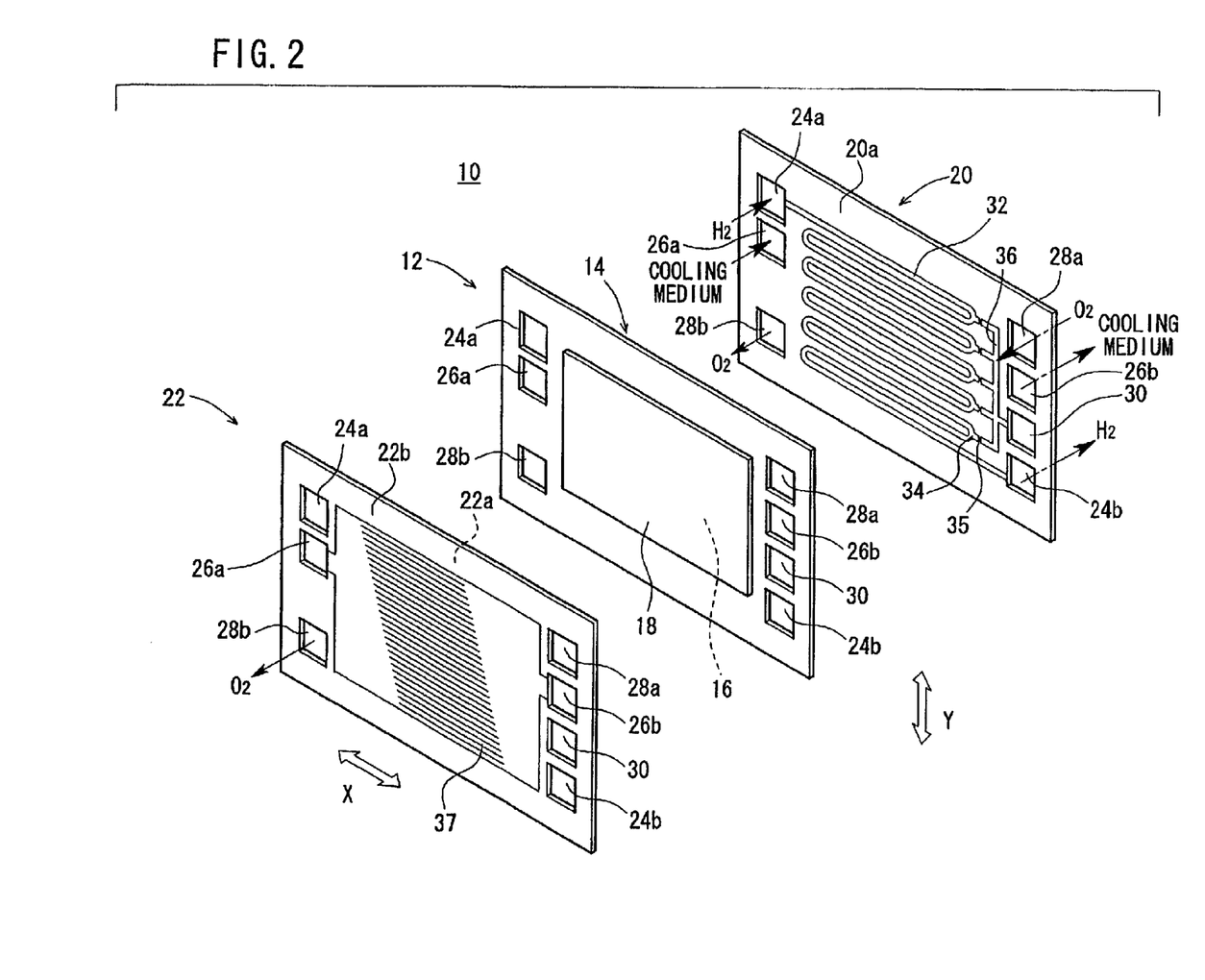
FIG. 2 is an exploded perspective view of the fuel cell shown in FIG. 1.

FIG. 1 shows in schematic perspective a fuel cell stack 11 incorporating a fuel cell 10 according to a first embodiment of the present invention, and FIG. 2 shows the fuel cell 10 in exploded perspective.

As shown in FIG. 2, the fuel cell 10 has a membrane electrode assembly 12 comprising a solid polymer ion exchange membrane 14, an anode electrode 16 mounted on one surface of the solid polymer ion exchange membrane 14, and a cathode electrode 18 mounted on the other surface of the solid polymer ion exchange membrane 14. Each of the anode electrode 16 and the cathode electrode 18 comprises a catalytic electrode layer of precious metal which is joined to a gas diffusion layer comprising a porous layer such as of porous carbon paper or the like, for example.

The membrane electrode assembly 12 is sandwiched between an anode separator 20 and a cathode separator 22, making up the fuel cell 10. The fuel cell 10 has a fuel gas supply passage 24a, a cooling medium supply passage 26a, and an oxidizing gas discharge passage 28b which are defined in one end thereof in its longitudinal direction indicated by the arrow X, and also has an oxidizing gas supply passage 28a, a cooling medium discharge passage 26b, an intermediate fuel gas supply passage 30, and a fuel gas discharge passage 24b which are defined in the opposite end thereof in its longitudinal direction.

Figure 3:
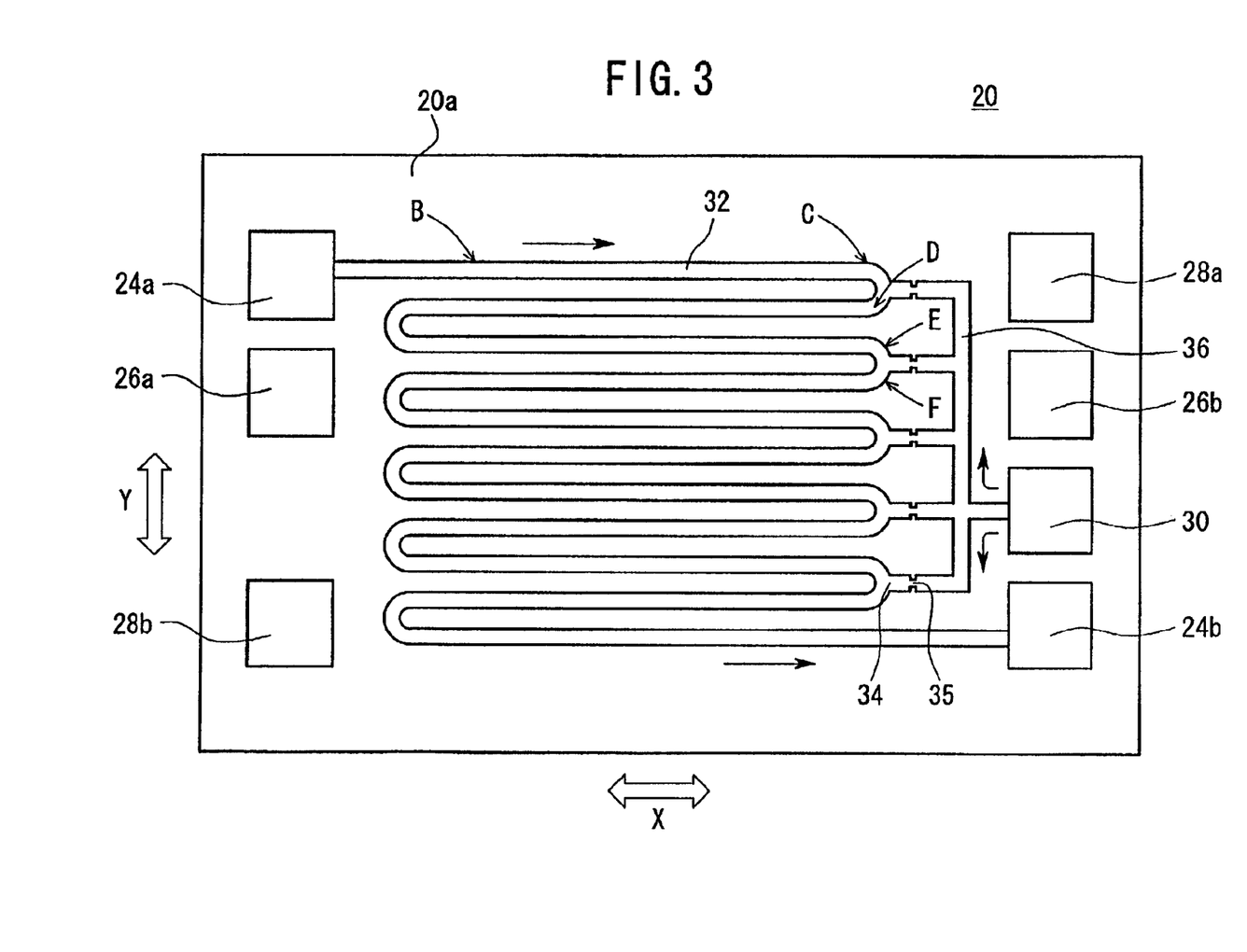
FIG. 3 is a front elevational view of an anode separator of the fuel cell.

As shown in FIGS. 2 and 3, the anode separator 20 has a fuel gas passage 32 defined in a surface 20a thereof which faces the anode electrode 16. The fuel gas passage 32 has an end connected to the fuel gas supply passage 24a, and is curved back in the longitudinal direction and extends in a meandering pattern in the direction of gravity indicated by the arrow Y, and has an opposite end connected to the fuel gas discharge passage 24b.

The fuel gas passage 32 has a succession of curved ends connected to intermediate fuel gas supply ports 34 having respective orifices 35. The intermediate fuel gas supply ports 34 communicate with the intermediate fuel gas supply passage 30 through a passageway 36 defined in the surface 20a of the anode separator 20.

The cathode separator 22 has a meandering oxidizing gas passage (not shown) defined in a surface 22a thereof which faces the cathode electrode 18, the meandering oxidizing gas passage having opposite ends connected respectively to the oxidizing gas supply passage 28a and the oxidizing gas discharge passage 28b. The cathode separator 22 also has a cooling medium passage 37 defined in an opposite surface 22b thereof and connected respectively to the cooling medium supply passage 26a and the cooling medium discharge passage 26b.

As shown in FIG. 1, a plurality of fuel cells 10 thus constructed are stacked in the direction indicated by the arrow Z, and end plates 38a, 38b are disposed on the respective ends of the stack. The end plates 38a, 38b with the stacked fuel cells 10 interposed therebetween are fastened to each other by fastening bolts, not shown, providing a fuel cell stack 11.

The fuel cell stack 11 is combined with a fuel gas supply system 40 for supplying a fuel gas such as a hydrogen-containing gas into the fuel cells 10, an oxidizing gas supply system 42 for supplying an oxidizing gas such as an oxygen-containing gas or air into the fuel cells 10, and a cooling medium supply system 44 for supplying a cooling medium into the fuel cells 10.

Figure 4:
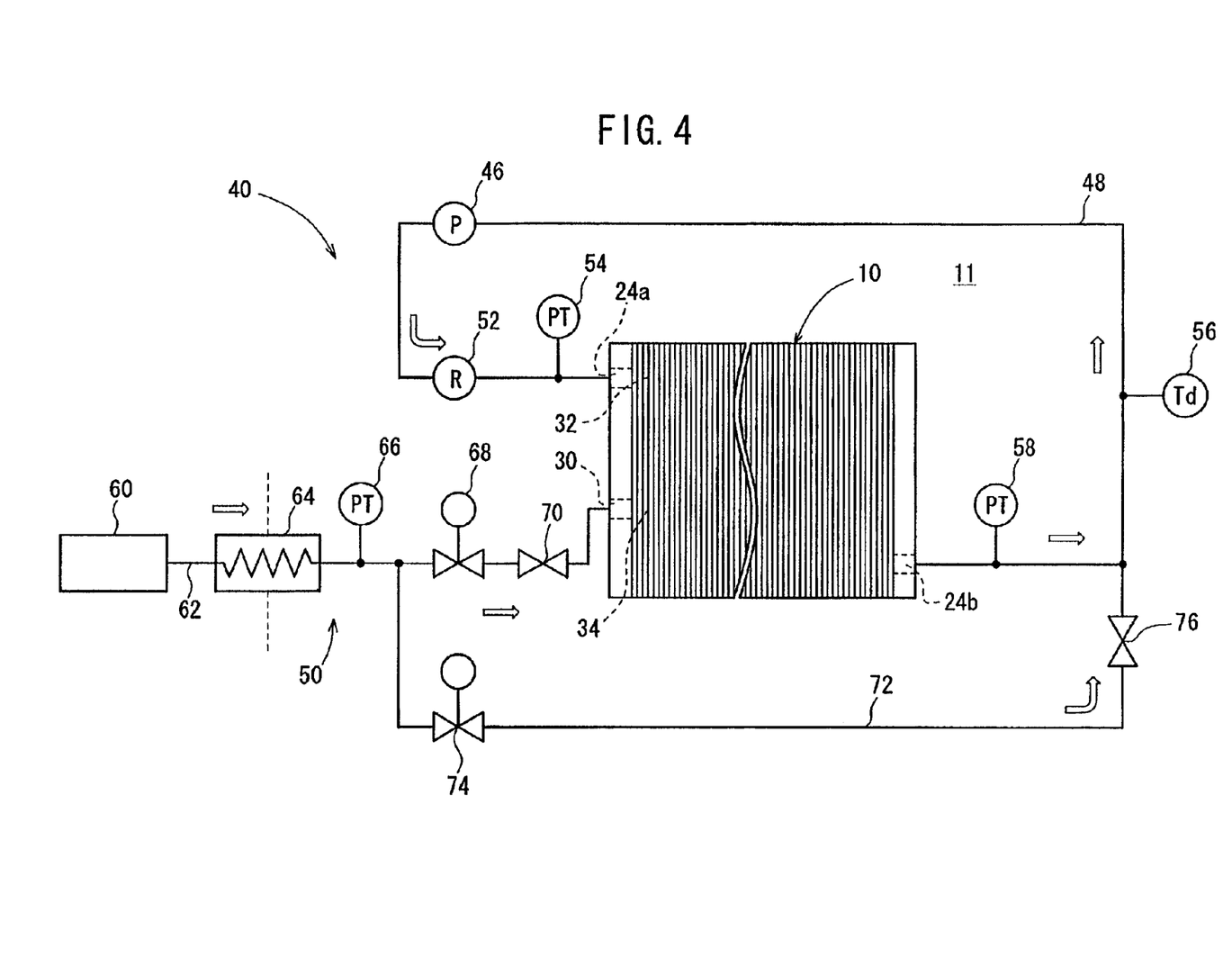
FIG. 4 is a schematic view of a fuel gas supply system for supplying a fuel gas into the fuel cell.

As shown in FIGS. 1 and 4, the fuel gas supply system 40 comprises a circulation passage 48 connecting a fuel gas pump 46 disposed outside of the fuel cells 10 in series to the fuel gas passage 32, and an intermediate fuel gas supply mechanism 50 for supplying a fuel gas, which is lower in humidity than a fuel gas flowing upstream of the intermediate fuel gas supply ports 34 connected to the fuel gas passage 32, from the intermediate fuel gas supply ports 34 to the fuel gas passage 32.

To the circulation passage 48, there are connected a flow meter 52 and a temperature/pressure sensor 54 which are positioned on an outlet side of the fuel gas pump 46, and a dew-point hygrometer 56 and a temperature/pressure sensor 57 which are positioned on an inlet side of the fuel gas pump 46.

The intermediate fuel gas supply mechanism 50 has a fuel gas tank 60 connected to the intermediate fuel gas supply passage 30 by an intermediate fuel gas passage 62. To the intermediate fuel gas passage 62, there are connected a temperature regulator such as a heat exchanger 64, a temperature/pressure sensor 66, a first regulator 68, and a first check valve 70 which are positioned successively from the fuel gas tank 60 to the fuel cells 10.

To the intermediate fuel gas passage 62, there is also connected a bypass gas passage 72 having an end connected between the temperature/pressure sensor 66 and the first regulator 68. The opposite end of the bypass gas passage 72 is connected to the circulation passage 48 between the fuel gas discharge passage 24b as a fuel gas discharge port and the fuel gas inlet port of the fuel gas pump 46.

A second regulator 74 and a second check valve 76 are connected to the bypass gas passage 72. The dew-point hygrometer 56 is connected to the circulation passage 48 between the fuel gas inlet port of the fuel gas pump 46 and the junction between the bypass gas passage 72 and the circulation passage 48.

Figure 5:
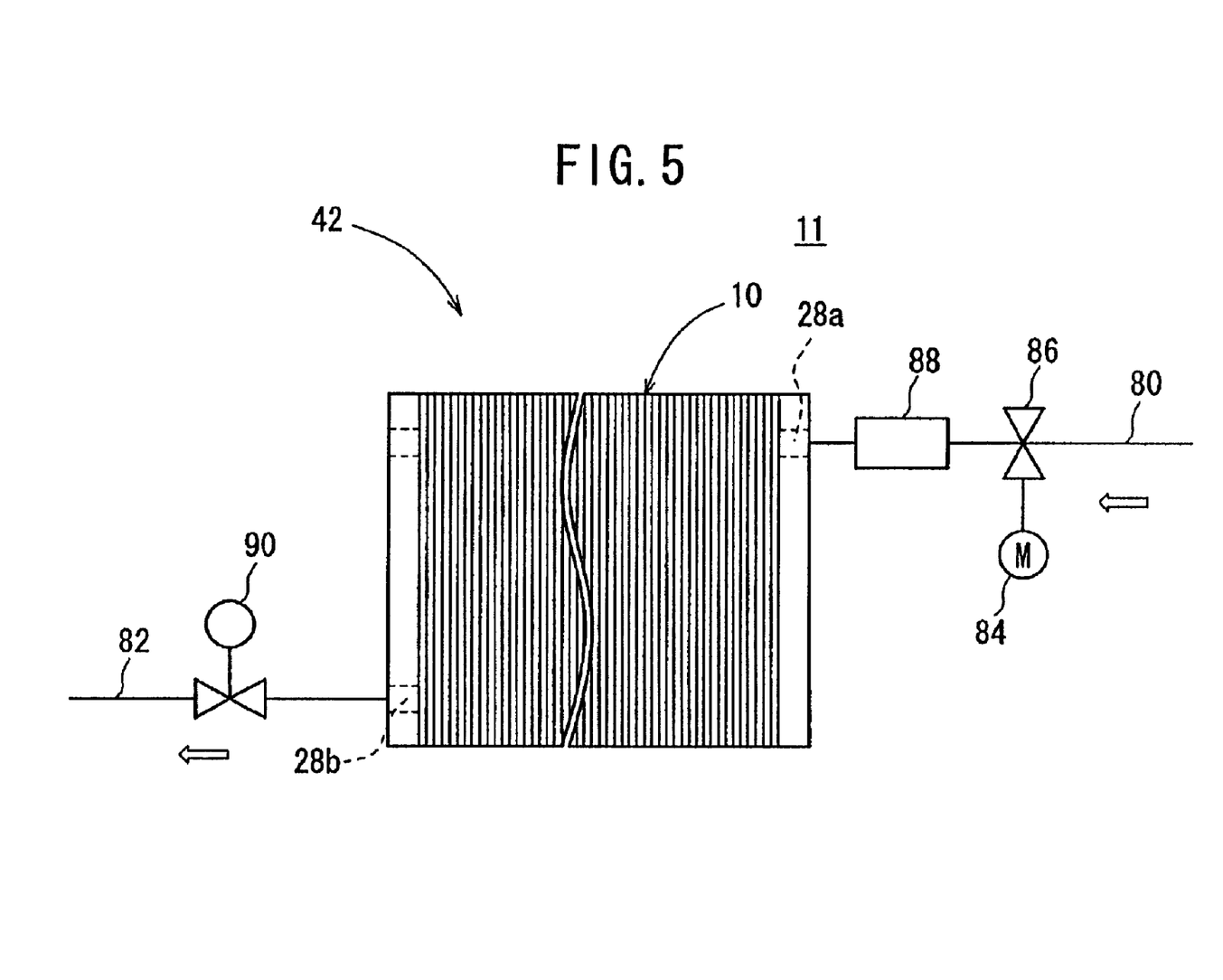
FIG. 5 is a schematic view of an oxidizing gas supply system for supplying an oxidizing gas into the fuel cell.

As shown in FIGS. 1 and 5, the oxidizing gas supply system 42 comprises oxidizing gas passages 80, 82 connected respectively to the oxidizing gas supply passage 28a and the oxidizing gas discharge passage 28b. A supercharger 86 coupled to a motor 84 and a humidifier 88 are connected to the oxidizing gas passage 80, and a pressure regulating valve 90 is connected to the oxidizing gas passage 82.

Figure 6:
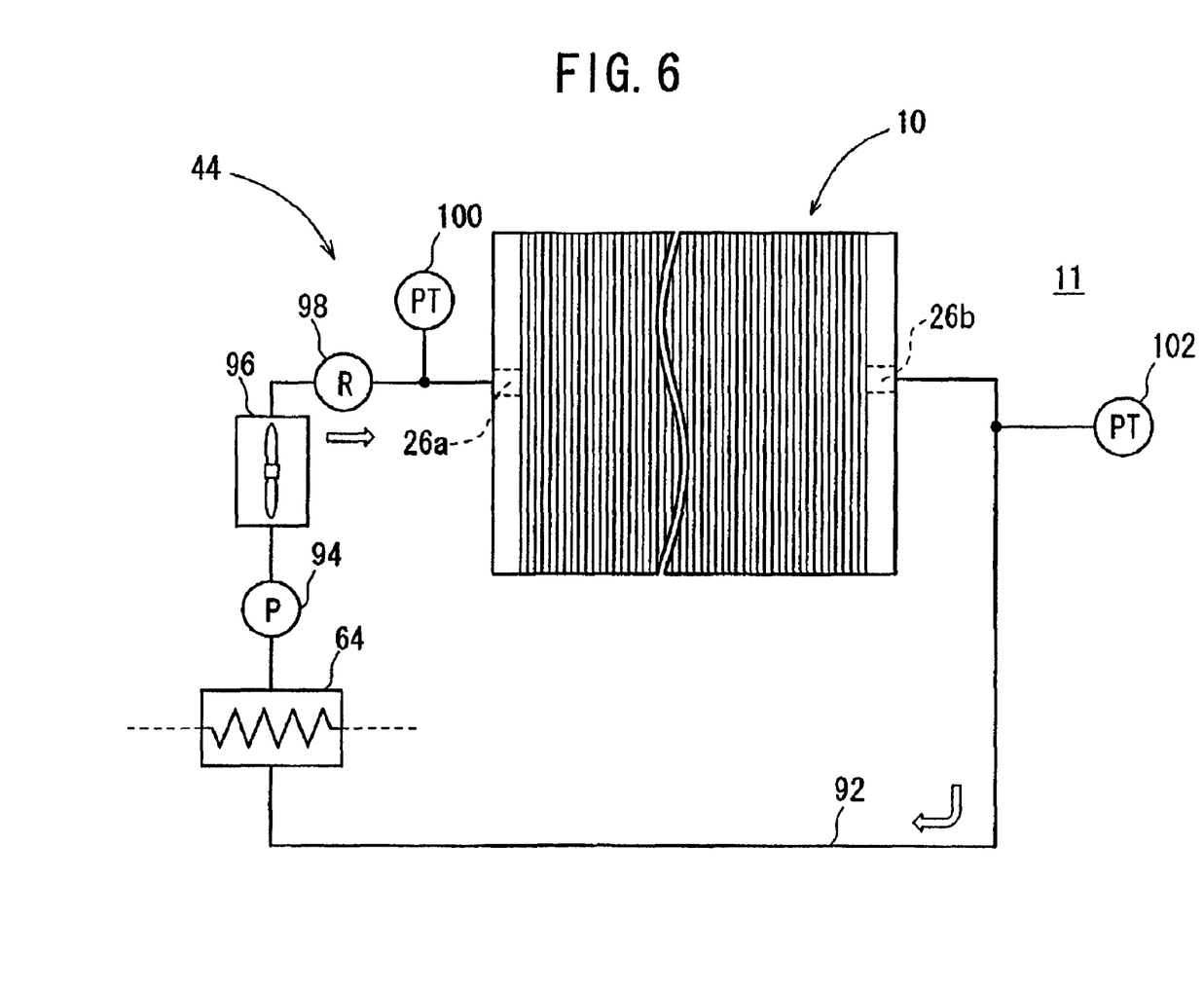
FIG. 6 is a schematic view of a cooling medium supply system for supplying a cooling medium into the fuel cell.

As shown in FIGS. 1 and 6, the cooling medium supply system 44 has a looped cooling medium line 92 connected to the cooling medium supply passage 26a and the cooling medium discharge passage 26b.

A pump 94 and a radiator 96 disposed on a cooling medium outlet side of the pump 94 are connected to the cooling medium line 92. The cooling medium supply passage 26a of the fuel cells 10 is connected to the radiator 96 through a flow meter 98 and a temperature/pressure sensor 100. The flow meter 98 and the temperature/pressure sensor 100 are disposed downstream of the radiator 96.

A temperature/pressure sensor 102 is connected to the cooling medium line 92 near the cooling medium discharge passage 26b. The heat exchanger 64 is connected to the cooling medium line 92 between the temperature/pressure sensor 102 and the pump 94. A cooling medium having a relatively high temperature which is discharged from the fuel cells 10 is introduced into the heat exchanger 64, and performs a heat exchange with the fuel gas supplied from the fuel gas tank 60 to regulate the temperature of the fuel gas so as to be substantially equal to the temperature of the fuel gas flowing through the fuel cells 10.

Operation of the fuel cell stack 11 associated with the fuel gas supply system 40, the oxidizing gas supply system 42, and the cooling medium supply system 44 thus constructed will be described below in relation to an operating method according to the present invention.

In the fuel gas supply system 40, as shown in FIG. 4, a fuel gas such as a hydrogen-containing gas or the like is present in the circulation passage 48. When the fuel gas pump 46 operates, the fuel gas is supplied through the circulation passage 48 to the fuel cells 10 of the fuel cell stack 11.

In the oxidizing gas supply system 42, as shown in FIG. 5, the motor 84 is energized to cause the supercharger 86 to deliver an oxidizing gas such as an oxygen-containing gas or air under pressure. The oxidizing gas is humidified by the humidifier 88, and then supplied to the fuel cells 10 of the fuel cell stack 11.

In each of the fuel cells 10, as shown in FIGS. 2 and 3, when the fuel gas is supplied to the fuel gas supply passage 24a, it is introduced into the fuel gas passage 32 connected to the fuel gas supply passage 24a. The fuel gas flows through the fuel gas passage 32 and is supplied between the anode electrode 16 and the anode separator 20, moves along the plane of the anode electrode 16, is then discharged into the fuel gas discharge passage 24b, and delivered to the circulation passage 48 connected to the fuel gas discharge passage 24b.

The oxidizing gas is supplied to the oxidizing gas supply passage 28a, flows through the oxidizing gas passage (not shown) defined between the cathode electrode 18 and the cathode separator 22, and is then discharged into the oxidizing gas discharge passage 28b. In the membrane electrode assembly 12, therefore, the fuel gas supplied along the plane of the anode electrode 16 and the oxidizing gas supplied along the plane of the cathode electrode 18 are consumed by a catalytic reaction in the catalytic layer, generating electric energy.

At this time, in the cooling medium supply system 44, as shown in FIGS. 1 and 6, the cooling medium in the cooling medium line 92 is delivered by the pump 94, cooled by the radiator 96, and supplied to each of the fuel cells 10 of the fuel cell stack 11.

In each of the fuel cells 10, the cooling medium supply passage 26a is supplied with the cooling medium, such as pure water, ethylene glycol, oil, or the like. The cooling medium flows through the cooling medium passage 37 in the cathode separator 22, cools the fuel cell 10, and thereafter is discharged into the cooling medium discharge passage 26b (see FIG. 2). Since the cooling medium line 92 is connected to the outlet of the cooling medium discharge passage 26b, the cooling medium discharged from the fuel cell stack 11 is returned to the cooling medium line 92.

In the first embodiment, the fuel gas tank 60 of the intermediate fuel gas supply mechanism 50 of the fuel gas supply system 40 supplies the fuel gas of low humidity to the intermediate fuel gas passage 62 (see FIGS. 1 and 4).

Since the fuel gas of low humidity is introduced into the heat exchanger 64, it performs a heat exchange with the cooling medium which has been heated to a higher temperature by cooling the fuel cells 10. Therefore, the fuel gas of low humidity has its temperature regulated to substantially same temperature as the fuel gas supplied through the circulation passage 48 to the fuel gas passage 32.

The fuel gas of low humidity whose temperature has thus been regulated is partly supplied through the first regulator 68 and the first check valve 70 to the intermediate fuel gas supply passage 30 of the fuel cell 10. The remainder of the fuel gas of low humidity is introduced into the bypass gas passage 72, and supplied through the second regulator 74 and the second check valve 76 to the circulation passage 48.

Figure 7:
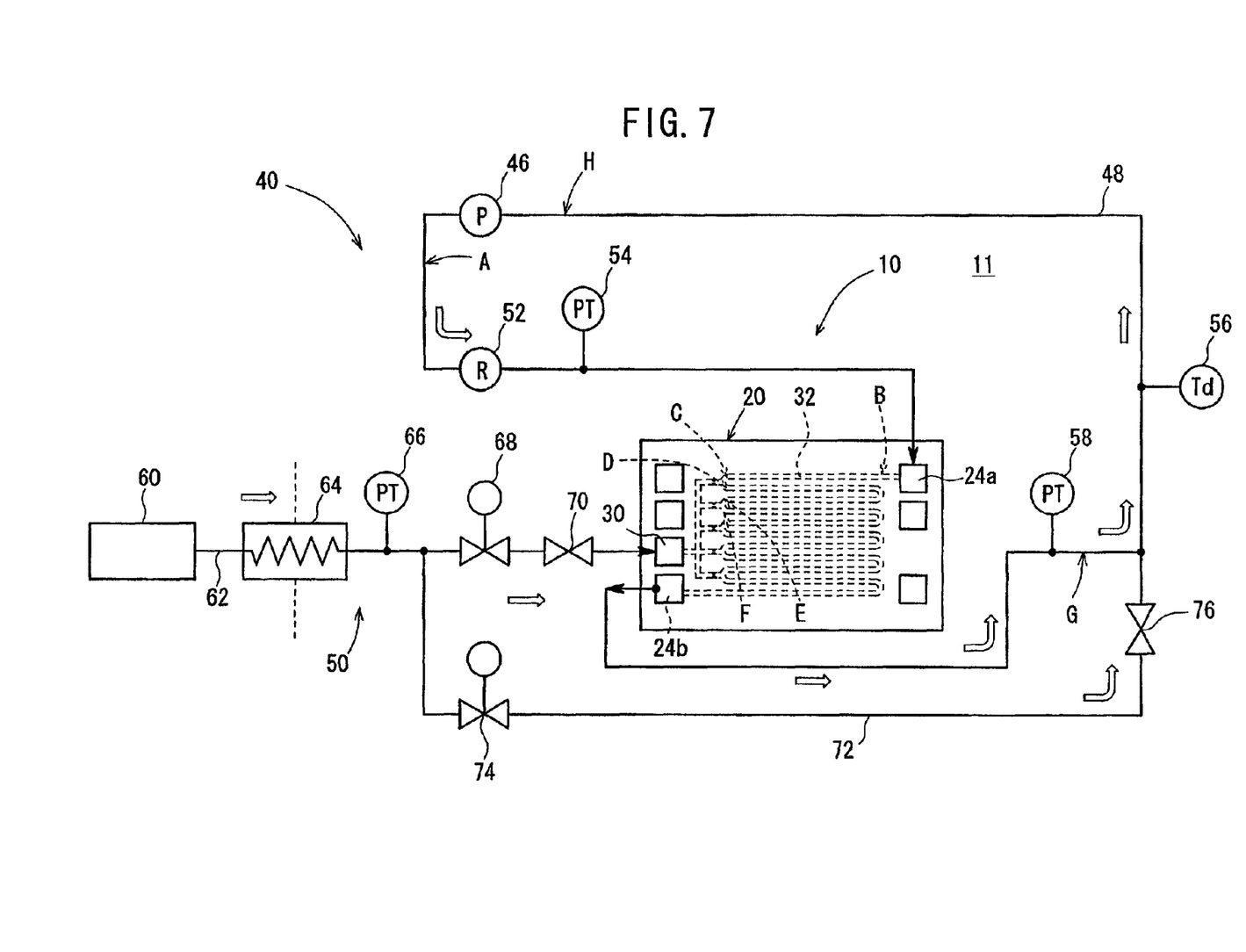
FIG. 7 is a schematic view showing the relationship between the fuel gas supply system and the anode separator.

As shown in FIGS. 3 and 7, the fuel gas of low humidity supplied to the intermediate fuel gas supply passage 30 is delivered through the passageway 36 defined in the surface 20a of the anode separator 20 uniformly to the intermediate fuel gas supply ports 34 after being reduced in pressure by the orifices 35. Since the intermediate fuel gas supply ports 34 are connected to the respective curved ends of the fuel gas passage 32, the fuel gas of low humidity is supplied from the intermediate fuel gas supply ports 34 to the fuel gas passage 32.

At this time, water is produced by a reaction on the cathode electrode 18 of each of the fuel cells 10. Therefore, water vapor is diffused back from the cathode electrode 18 into the fuel gas passage 32 facing the anode electrode 16, and the fuel gas in the fuel gas passage 32 tends to be excessively saturated by the consumption of the fuel gas when electric energy is generated by the fuel cell stack 11.

According to the first embodiment, the fuel gas of lower humidity than the fuel gas flowing upstream of the intermediate fuel gas supply ports 34 along the fuel gas passage 32 is supplied from the intermediate fuel gas supply ports 34 to the fuel gas passage 32. Therefore, the relative humidity of the fuel gas in the fuel cell 10 is maintained at a level optimum for the generation of electric energy, e.g., 80% or higher and less than 100%, for effectively preventing water from being condensed.

Figure 8:
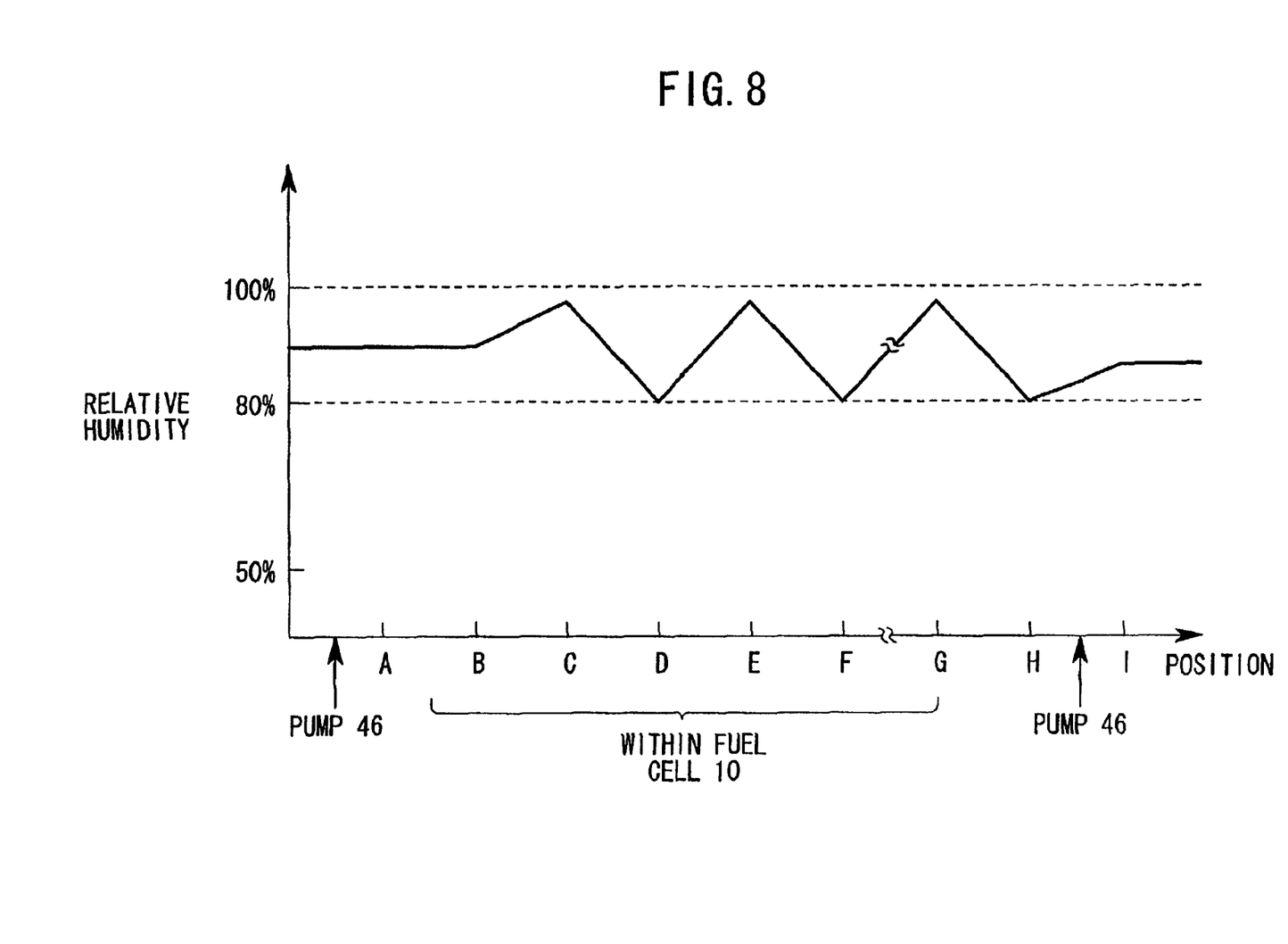
FIG. 8 is a diagram of relative humidities in regions where the fuel gas passes.

Specifically, when relative humidifies in regions A through H where the fuel gas flows in FIGS. 3 and 7 were detected, the results shown in FIG. 8 were obtained. Thus, when the relative humidity of the fuel gas increases due to the back diffusion of the water vapor and the consumption of the fuel gas, the relative humidity is lowered by the fuel gas of low humidity supplied to the intermediate fuel gas supply ports 34, so that the overall relative humidity is maintained at a level optimum for the generation of electric energy.

In the first embodiment, the fuel gas passages 32 of the fuel cells 10 and the fuel gas pump 46 disposed outside of the fuel cells 10 are connected in series to each other by the circulation passage 48. Therefore, the discharged gas containing the fuel gas discharged from the fuel cells 10 flows through the circulation passage 48 and is then supplied again as a fuel gas to the fuel gas passages 32 of the fuel cells 10. The fuel gas can thus efficiently be used highly economically.

In the intermediate fuel gas supply mechanism 50, the fuel gas of low humidity supplied to the intermediate fuel gas supply ports 34 is regulated in temperature by the heat exchanger 64 so as to have substantially the same temperature as the fuel gas supplied through the circulation passage 48 to the fuel gas passage 32. Therefore, the fuel gas temperature does not change when the fuel gas flowing through the fuel gas passage 32 and the fuel gas of low humidity supplied from the intermediate fuel gas supply ports 34 join each other. As a result, water is effectively prevented from being condensed due to a reduction in the temperature of the fuel gas with a simple arrangement.

In the first embodiment, the bypass gas passage 72 of the intermediate fuel gas supply mechanism 50 is branched from the intermediate fuel gas passage 62 and connected to the circulation passage 48. Therefore, the passage region between the fuel gas discharge passage 24b which serves as the fuel gas discharge port of the fuel cell stack 11 and the fuel gas pump 46 is supplied with the fuel gas which is lower in humidity than and substantially identical in temperature to the gas discharged from the fuel gas discharge passage 24b.

Consequently, the fuel gas of low humidity is mixed with the gas of high humidity just discharged from the fuel cells 10, producing a low-humidity gas in the circulation passage 48. The low-humidity gas is turned into a high-humidity gas by being increased in pressure by the fuel gas pump 46, and the high-humidity gas is supplied to the fuel cells 10. Therefore, condensed water is reliably prevented from being produced in the circulation passage 48.

The circulation passage 48 has the dew-point hygrometer 56 positioned between the fuel gas inlet port of the fuel gas pump 46 and the junction between the bypass gas passage 72 and the circulation passage 48. Since the flow rate of the fuel gas of low humidity is regulated based on the humidity detected by the dew-point hygrometer 56, the humidity of the fuel gas introduced into the fuel gas pump 46 is controlled.

Thus, condensed water is reliably prevented from being produced and the fuel gas can efficiently be used. The flow rate of the fuel gas of low humidity may be regulated based on a preset map representing the relationship between the humidity and the flow rate, for example, rather than using the dew-point hygrometer 56.

In the fuel gas supply system 40, the temperature/pressure sensors 54, 66, 58 are disposed in association with the fuel gas supply and discharge ports of the fuel cell stack 11. In the cooling medium supply system 44, the temperature/pressure sensors 100, 102 are disposed in association with the cooling medium supply and discharge ports of the fuel cell stack 11. The fuel gas supply system 40 and the cooling medium supply system 44 have the flow sensors 52, 98, respectively, for detecting the flow rates of the fuel gas and the cooling medium.

Figure 9:
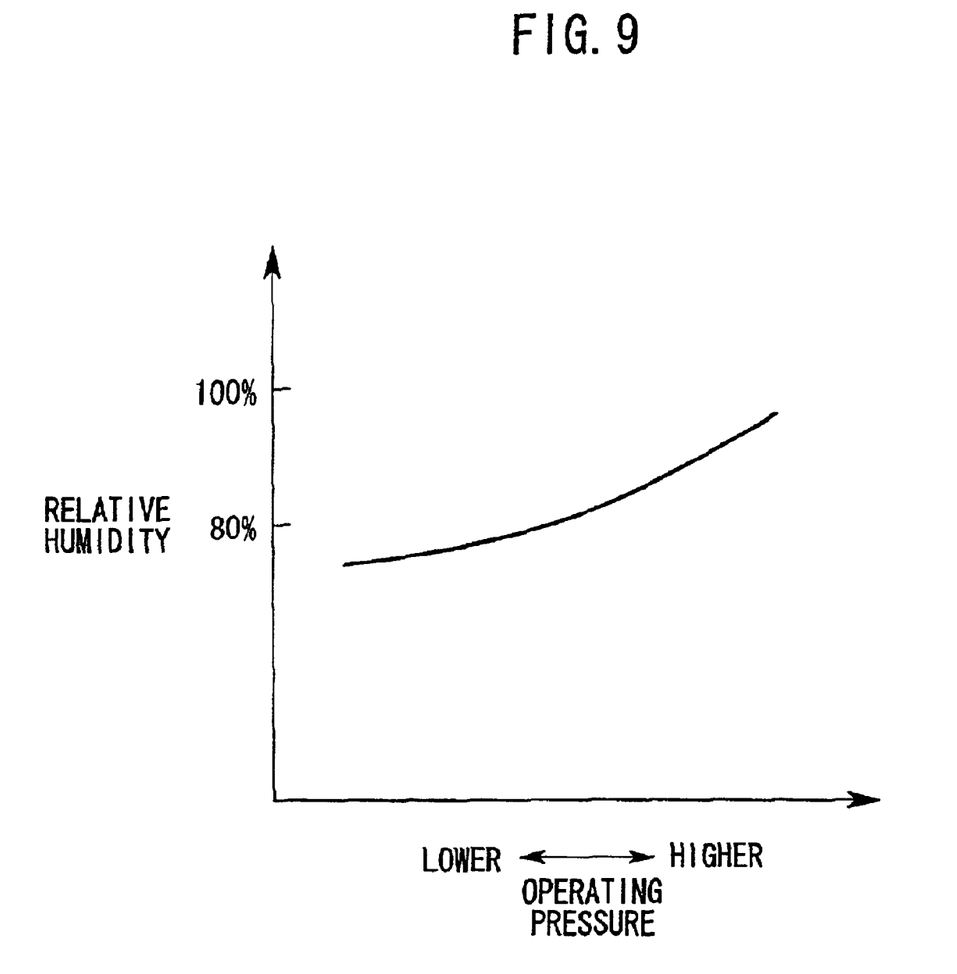
FIG. 9 is a diagram showing the relationship between is the operating pressure and the relative humidity.

By detecting the amount of heat generated upon water condensation, the operating pressure for supplying the fuel gas from the fuel gas pump 46 can be lowered as much as possible according to the characteristics of the membrane electrode assembly 12. Since the pressure on the cathode electrode is comparatively high, although the amount of water vapor diffused from the cathode electrode back to the anode electrode is increased, the relative humidity in the fuel cells 10 is reduced, making it possible to effectively avoid the condensation of water vapor (see FIG. 9).

While water vapor tends to be condensed when the fuel cells 10 are not in steady operation, e.g., when the fuel cells 10 start to operate, the condensation of water vapor can be suppressed by lowering the operation pressure.

Figure 10:
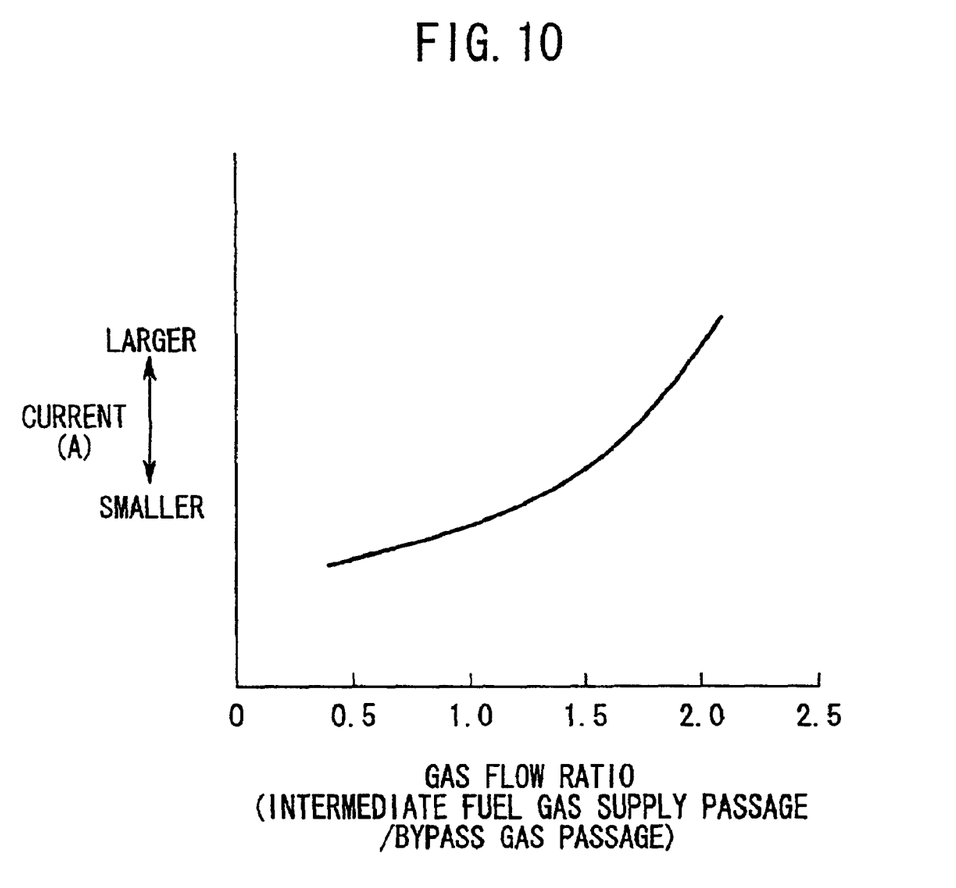
FIG. 10 is a diagram showing the relationship between the distributed amount of the fuel gas and the current.

In order to obtain a high output (large current) from the fuel cells 10, the first and second regulators 68, 74 are controlled to make the flow rate of the fuel gas supplied to the intermediate fuel gas supply passage 30, higher than the flow rate of the fuel gas supplied to the bypass gas-passage 72 (see FIG. 10).

Figure 11:
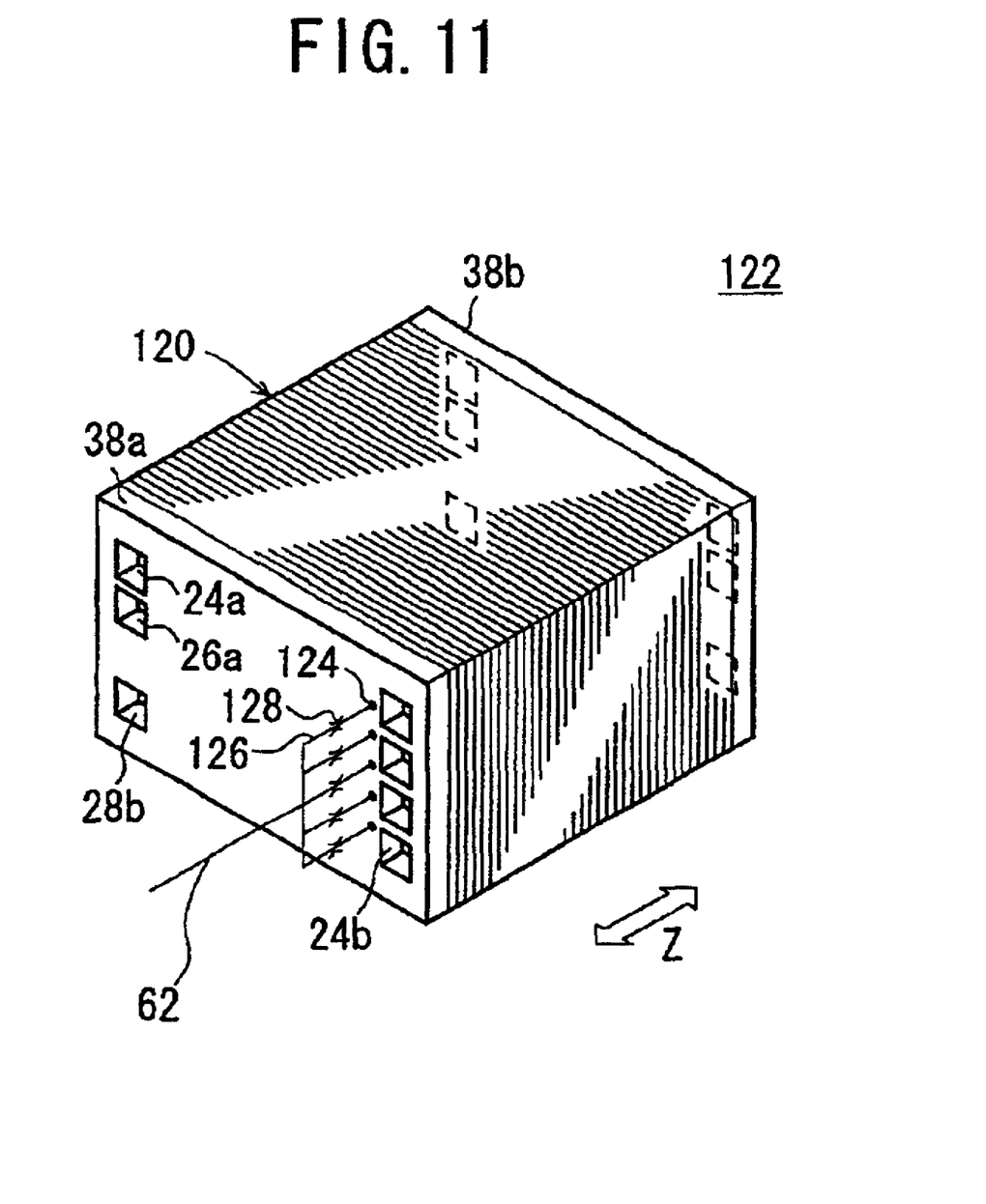
FIG. 11 is a schematic perspective view of a fuel cell stack incorporating a fuel cell according to a second embodiment of the present invention.
Figure 12:
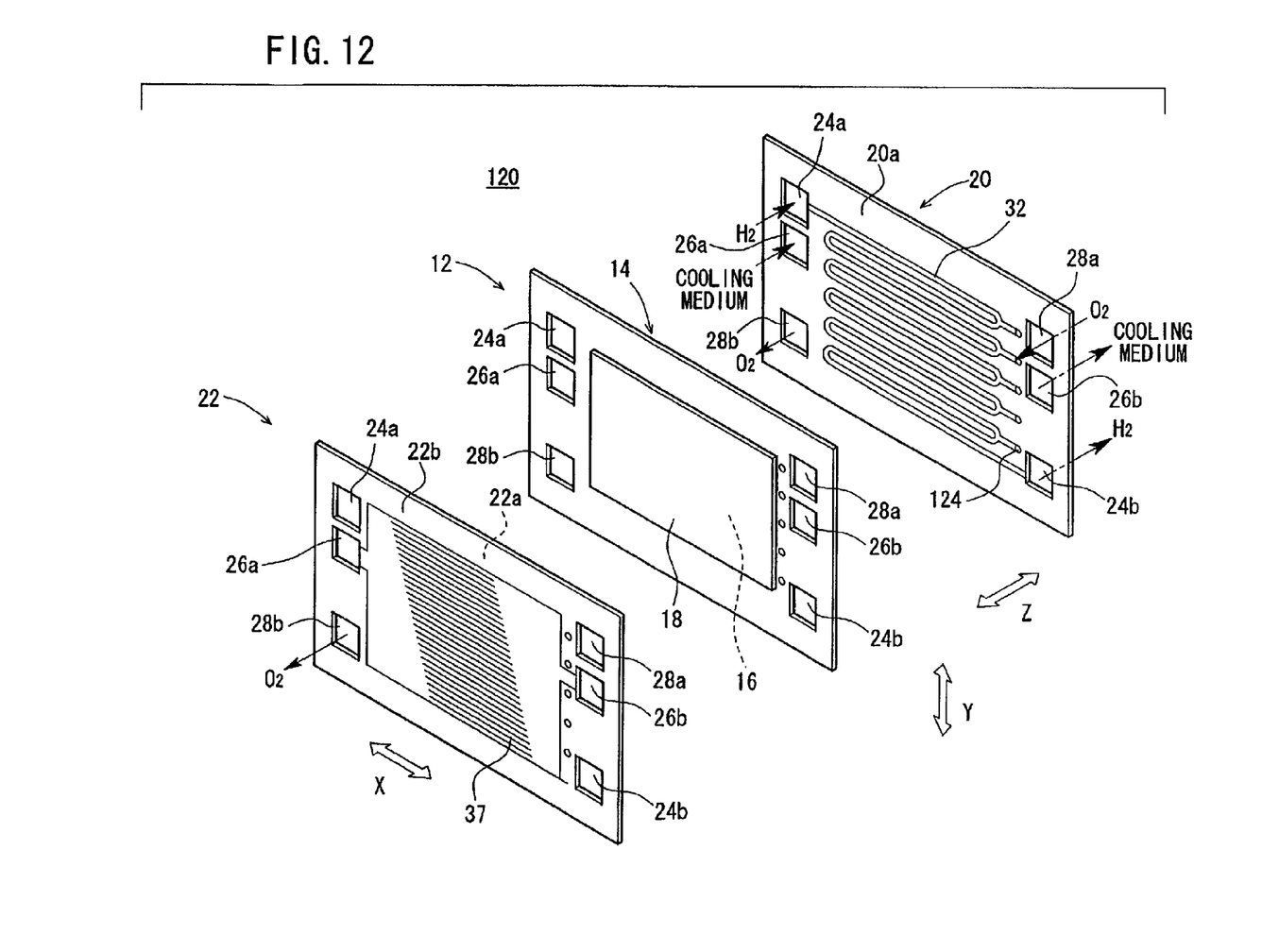
FIG. 12 is an exploded perspective view of the fuel cell shown in FIG. 11.

FIG. 11 shows in schematic perspective a fuel cell stack 122 incorporating a fuel cell 120 according to a second embodiment of the present invention, and FIG. 12 shows the fuel cell 120 in exploded perspective. Those parts of the fuel cell 120 and the fuel cell stack 122 which are identical to those of the fuel cell 10 and the fuel cell stack 11 according to the first embodiment are denoted by identical reference characters, and will not be described in detail below.

In the fuel cell 120, intermediate fuel gas supply ports 124 are connected to respective curved ends of the fuel gas passage 32, and extend through the fuel cell 120 in the direction indicated by the arrow Z. There are five intermediate fuel gas supply passages 126, for example, connected respectively to the intermediate fuel gas supply ports 124. The intermediate fuel gas supply passages 126 extend out of the fuel cell stack 122 and communicate with the intermediate fuel gas passage 62, with orifices 128 disposed respectively in the intermediate fuel gas supply passages 126.

The fuel cell stack 122 thus constructed operates as follows: A fuel gas of low humidity delivered from the intermediate fuel gas passage 62 is divided into the intermediate fuel gas supply passages 126 and supplied to the intermediate fuel gas supply ports 124 after being reduced in pressure by the orifices 128. The fuel gas of low humidity is delivered toward the fuel cell stack 122 in the direction indicated by the arrow Z, and supplied uniformly to the intermediate fuel gas supply ports 124 of the fuel cells 120.

The intermediate fuel gas supply ports 124 are connected to the respective curved ends of the fuel gas passage 32, so that the fuel gas of low humidity is supplied from the intermediate fuel gas supply ports 124 to the fuel gas passage 32.

In the second embodiment, a fuel gas of low humidity which is of substantially the same temperature as the fuel gas supplied to the fuel gas passage 32 is supplied from the intermediate fuel gas passage 62 to the intermediate fuel gas supply passages 126. Therefore, the relative humidity of the fuel gas in the fuel cells 120 is reliably maintained at a level optimum for the generation of electric energy, so that the fuel cells 120 according to the second embodiment offer the same advantages as those of the fuel cell 10 according to the first embodiment.

In the second embodiment, the intermediate fuel gas supply passages 126 connected to the intermediate fuel gas supply ports 124 extend out of the fuel cell stack 122, and the orifices 128 are provided respectively in the intermediate fuel gas supply passages 126.

The orifices 128 can thus easily be adjusted from outside of the fuel cell stack 122 for optimizing the distribution of the fuel gas to the intermediate fuel gas supply ports 124 thereby to highly accurately uniformize the reaction in the plane where electric power is generated.

With the fuel cell and operating method therefore according to the present invention, the fuel gas passage between the cathode electrode and the anode electrode is supplied with the fuel gas, which is lower in humidity than the fuel gas flowing upstream of the intermediate fuel gas supply ports. Therefore, the relative humidity of the fuel gas in the fuel cells is reliably maintained at a level optimum for the generation of electric energy, and condensed water is reliably prevented from being produced. Accordingly, the electric generating capability of the fuel cell can effectively be increased with a simple arrangement and process.

The fuel gas pump disposed outside of the fuel cell and the fuel gas passage are connected in series to each other through the circulation passage. Consequently, the discharged gas from the fuel cell flows through the circulation passage, and is supplied again as a fuel gas to the fuel cell through the circulation passage. The fuel gas can thus efficiently be used.

Although certain preferred embodiments of the present invention have been shown and described in detail, it should be understood that various changes and modifications may be made therein without departing from the scope of the appended claims.

What is claimed is:

1. A fuel cell comprising:
   a membrane electrode assembly comprising a solid polymer ion exchange membrane, an anode electrode mounted on one surface of said solid polymer ion exchange membrane, and a cathode electrode mounted on the other surface of said solid polymer ion exchange membrane:
   an anode separator;
   a cathode separator, said membrane electrode assembly being sandwiched between said anode separator and said cathode separator;
   a fuel gas passage disposed between said anode electrode and said anode separator;
   a circulation passage connecting a fuel gas pump disposed outside of the fuel cell in series to said fuel gas passage;
   an intermediate fuel gas supply port connected to said fuel gas passage between a fuel gas inlet and a fuel gas outlet thereof; and
   an intermediate fuel gas supply mechanism for supplying a fuel gas, which is lower in humidity than a fuel gas flowing upstream of said intermediate fuel gas supply port, from said intermediate fuel gas supply port to said fuel gas passage.

2. A fuel cell according to claim 1, wherein said fuel gas passage comprises a meandering passage having a curved end, said intermediate fuel gas supply port being connected to said curved end.

3. A fuel cell according to claim 2, further comprising:
   a single intermediate fuel gas passage connected to said intermediate fuel gas supply port through an orifice.

4. A fuel cell according to claim 1, wherein said intermediate fuel gas supply mechanism has a temperature regulator for regulating the temperature of the fuel gas supplied to said intermediate fuel gas supply port so as to be substantially equal to the temperature of the fuel gas supplied through said circulation passage to said fuel gas passage.

5. A fuel cell according to claim 4, wherein said temperature regulator comprises:
   a heat exchanger for effecting a heat exchange between a cooling medium which is discharged from said fuel cell after having cooled the fuel cell and the fuel gas supplied to said intermediate fuel gas supply port.

6. A fuel cell according to claim 4, wherein said intermediate fuel gas supply mechanism has an intermediate fuel gas passage connected to said circulation passage between a fuel gas discharge port of said fuel cell and a fuel gas inlet port of said fuel gas pump, for supplying a fuel gas, which is lower in humidity than and substantially identical in temperature to the fuel gas discharged from said fuel gas discharge port, to said circulation passage.

7. A fuel cell according to claim 6, further comprising:
   a dew-point hygrometer connected to said circulation passage between said fuel gas inlet port of said fuel gas pump and the junction between said circulation passage and said single intermediate fuel gas passage.

8. A fuel cell according to claim 5, further comprising:
   a cooling medium supply port for supplying the cooling medium to said fuel cell;
   a cooling medium discharge port for discharging the cooling medium from said fuel cell;
   a fuel gas supply port for supplying the fuel gas to said fuel cell;
   a fuel gas discharge port for discharging the fuel gas from said fuel cell; and
   at least either one of a temperature sensor, a pressure sensor, and a flow sensor which is connected to each of said cooling medium supply port, said cooling medium discharge port, said fuel gas supply port, and said fuel gas discharge port.

9. A method of operating a fuel cell having a membrane electrode assembly comprising a solid polymer ion exchange membrane, an anode electrode mounted on one surface of said solid polymer ion exchange membrane, and a cathode electrode mounted on the other surface of said solid polymer ion exchange membrane, an anode separator, a cathode separator, said membrane electrode assembly being sandwiched between said anode separator and said cathode separator, a fuel gas passage disposed between said anode electrode and said anode separator, and an intermediate fuel gas supply port connected to said fuel gas passage between a fuel gas inlet and a fuel gas outlet thereof, said method comprising the step of:

supplying a fuel gas, which is lower in humidity than a fuel gas flowing upstream of said intermediate fuel gas supply port, from said intermediate fuel gas supply port to said fuel gas passage, thereby preventing water from being condensed in said fuel gas passage.

10. A method according to claim 9, further comprising the step of:

regulating the temperature of the fuel gas supplied to said intermediate fuel gas supply port so as to be substantially equal to the temperature of the fuel gas supplied to said fuel gas passage.

11. A method according to claim 9, further comprising the steps of:

supplying a fuel gas circulatingly through a circulation passage connecting a fuel gas pump disposed outside of the fuel cell in series to said fuel gas passage; and supplying a fuel gas, which is lower in humidity than and substantially identical in temperature to the fuel gas discharged from a fuel gas discharge port of the fuel cell, to an intermediate fuel gas passage connected to said fuel gas discharge port and a fuel gas inlet port of said fuel gas pump.

12. A method according to claim 11, further comprising the step of:

regulating the flow rate of the fuel gas supplied from said intermediate fuel gas passage with a dew-point hygrometer which is connected to said circulation passage between said fuel gas inlet port of said fuel gas pump and the junction between said circulation passage and said single intermediate fuel gas passage.

13. A method according to claim 10, wherein said fuel cell has a cooling medium supply port for supplying the cooling medium to said fuel cell, a cooling medium discharge port for discharging the cooling medium from said fuel cell, a fuel gas supply port for supplying the fuel gas to said fuel cell, a fuel gas discharge port for discharging the fuel gas from said fuel cell, and at least either one of a temperature sensor, a pressure sensor, and a flow sensor which is connected to each of said cooling medium supply port, said cooling medium discharge port, said fuel gas supply port, and said fuel gas discharge port, further comprising the steps of:

detecting a change in the amount of heat with at least said temperature sensor, said pressure sensor, or said flow sensor; and regulating an operating pressure of said fuel cell based on the detected change in the amount of heat.

\* \* \* \* \*